Figure 1:
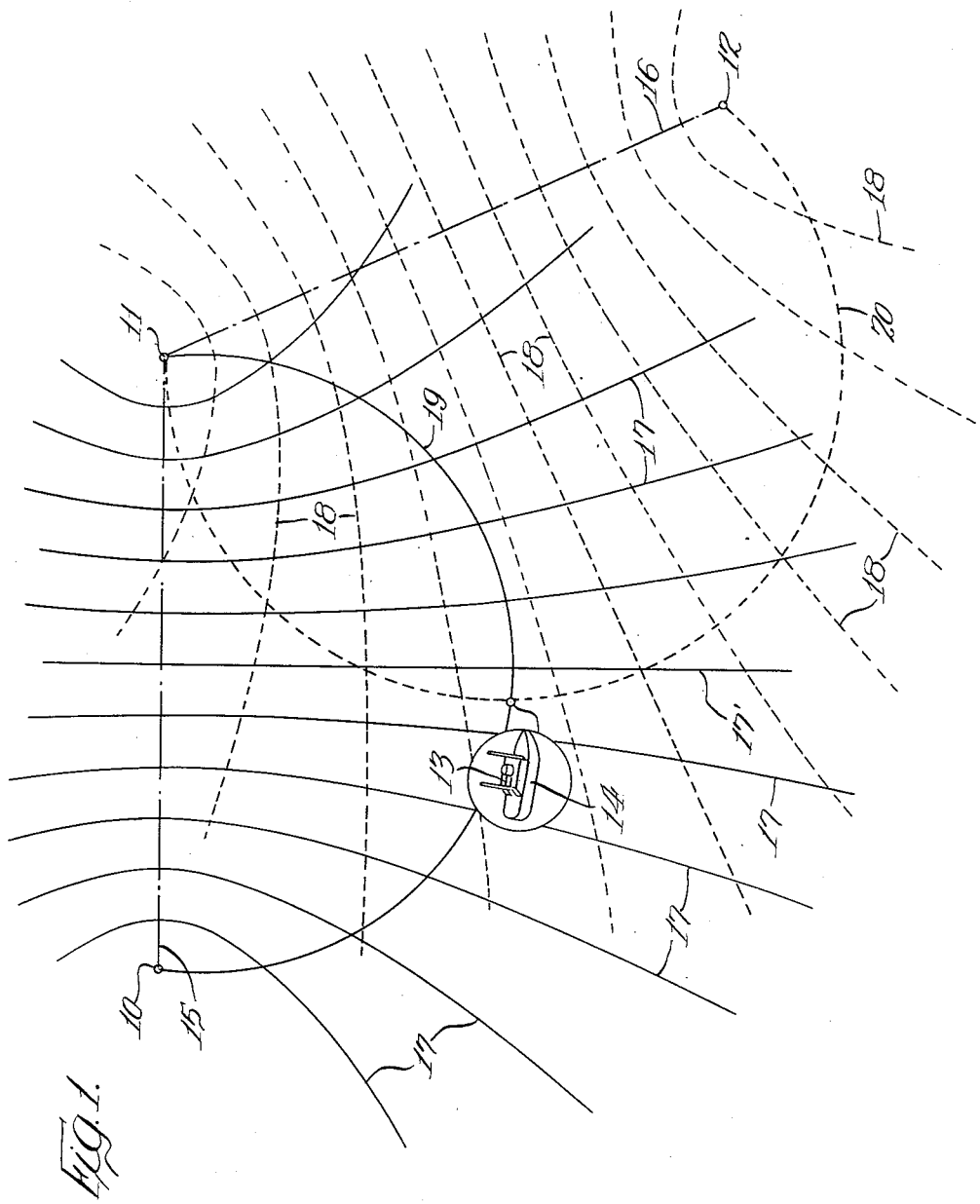

Nov. 26, 1957 J. E. HAWKINS 2,814,799
RADIO LOCATION SYSTEM
Filed Jan. 12, 1954 3 Sheets-Sheet 1

INVENTOR.
James E. Hawkins
BY
Mason, Kolehmainen, Rathburn & Wyss
Atty's.

Nov. 26, 1957   J. E. HAWKINS   2,814,799
RADIO LOCATION SYSTEM
Filed Jan. 12, 1954   3 Sheets-Sheet 2

INVENTOR.
James E. Hawkins
BY
Mason, Kolehmainen, Rathburn & Wyss
Attys.

Nov. 26, 1957  J. E. HAWKINS  2,814,799
RADIO LOCATION SYSTEM
Filed Jan. 12, 1954  3 Sheets-Sheet 3
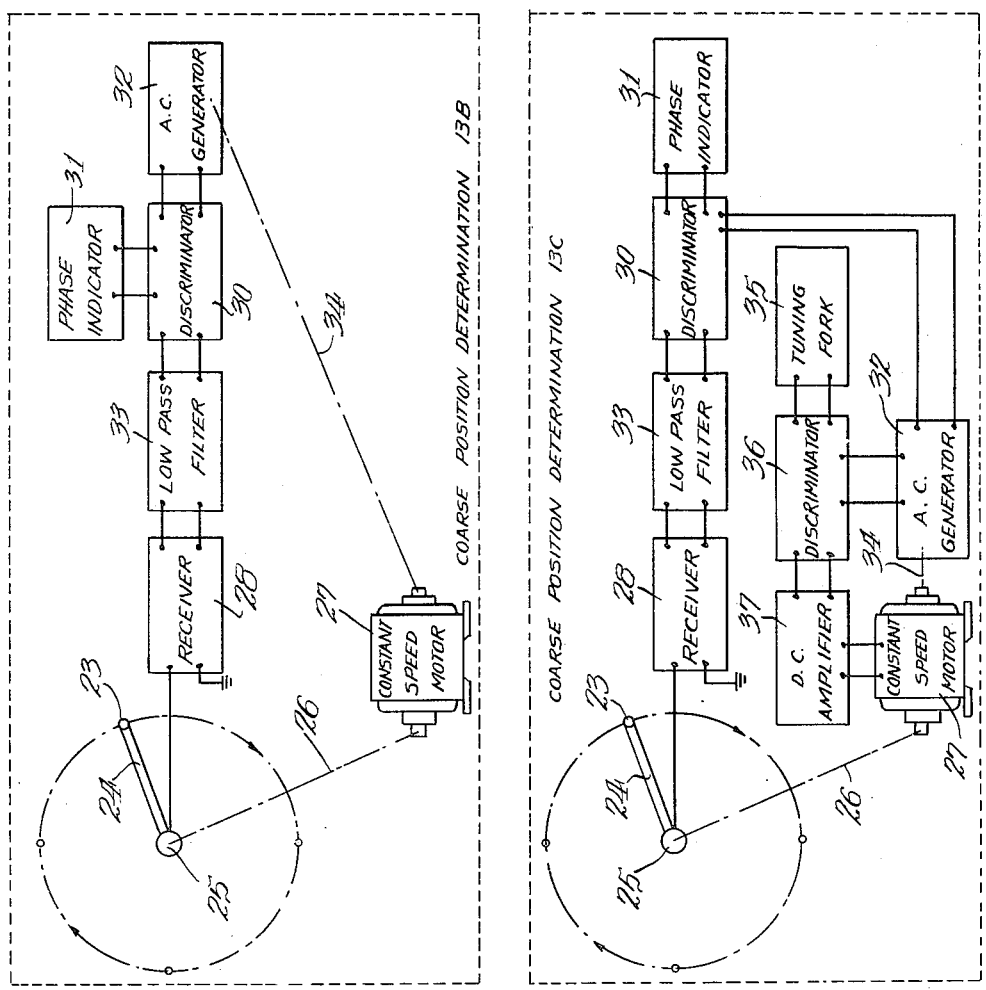
INVENTOR.
James E. Hawkins
BY
Mason, Kolehmainen, Rathburn & Wyss
Attys United States Patent Office 2,814,799
Patented Nov. 26, 1957

2,814,799

RADIO LOCATION SYSTEM

James E. Hawkins, Broken Arrow, Okla., assignor to Seismograph Service Corporation, Tulsa, Okla., a corporation of Delaware Application January 12, 1954, Serial No. 403,483

20 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line connecting the pair of transmitters, these isophase lines are spaced apart a distance equal to one half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

In Honore Patent No. 2,148,267 a system is disclosed in which the carrier waves of each pair of transmitters are heterodyned at a fixed link transmitting point, and the difference frequency component of the heterodyned waves is modulated as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines. In Hawkins and Finn U. S. Patent No. 2,513,317 an improved system is disclosed wherein a pair of transmitters are alternately operated as link transmitters and as position signal transmitters thereby reducing the number of signal channels required.

A particular problem encountered in the operation of continuous wave systems of the type disclosed in the Honore and Hawkins and Finn patents is that of eliminating ambiguity from the phase measurements which provide the desired position information. Thus, while the two phase measurements identify the position of the receiving station relative to two intersecting pairs of hyperbolic isophase lines, they do not indicate to which particular pairs of lines the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In Hawkins Patent No. 2,629,091 entitled Radio Location System and assigned to the same assignee as the present invention, there are disclosed improved radio location systems of the continuous wave type which are free not only of the phase synchronization difficulties overcome by the Honore and Hawkins and Finn patents but also of ambiguity problems. In the systems of the said Hawkins patent, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. In these systems indications having phase sensitivities different from the phase sensitivity of the indications obtained by producing pairs of beat frequency signals in accordance with the principles of the Honore system are obtained by again heterodyning the beat frequency signals thus obtained to produce position indicating and reference signals for phase comparison which have phase sensitivities determined by phantom frequencies corresponding to the sum of or difference between the mean frequency of the carrier waves from which the pairs of beat frequency signals were derived.

However, all of the above referred to systems employ at least one additional channel frequency to provide the coarse position determination and, in addition, these systems require extensive modification of the transmitting equipment utilized to provide the fine position indications. In a copending application Serial No. 377,094 of Stanley W. Wilcox and Warren Garrison filed August 28, 1953, entitled Method and Apparatus for Providing Lane Identification and assigned to the same assignee as the present invention, there is disclosed an improved method and apparatus for providing coarse position determination by measuring the rate of divergence of the isophase lines at the location of the receiving unit. The equipment therein disclosed for effecting the measurement of the expansion of the hyperbolas includes at least one pair of spaced antennas at the receiving station for receiving signals having a phase difference the magnitude of which is a function of the expansion factor. In certain installations, particularly aboard small ships, it is not convenient to space antennas apart by a distance sufficient to provide phase differences of measurable magnitude. Also the use of antennas spaced relatively large distances apart introduces the problem of accumulating the information derived from each antenna at a central location, for instance, at midships aboard a seagoing vessel, which, of course, necessitates the use of transmission lines or the like extending the full length of the ship.

It is an object of the present invention, therefore, to provide an improved radio location system of the above indicated type in which disadvantages pertaining to ambiguity are entirely obviated.

It is a further object of the present invention to provide an improved radio location system of the continuous wave type in which the above mentioned difficulties in providing ambiguity resolution are eliminated and which at the same time combines economy of channel frequencies with minimum cost of the equipment.

It is another object of the invention to provide an improved radio location system of the continuous wave type which affords a solution to the ambiguity problem without employing an additional channel frequency and without altering the transmitting equipment for establishing an accurate fix.

It is a still further object of the present invention to provide improved receiving equipment for use in radio location systems of the above-indicated character.

It is likewise an object of the present invention to provide improved apparatus for determining the approximate location of all types of mobile units positioned within a a hyperbolic field pattern.

It is still another object of the invention to provide improved apparatus for measuring the rate of divergence of the hyperbolic lines at any point in a continuous wave pattern in order to facilitate a determination of the location of said point.

Figure 2:
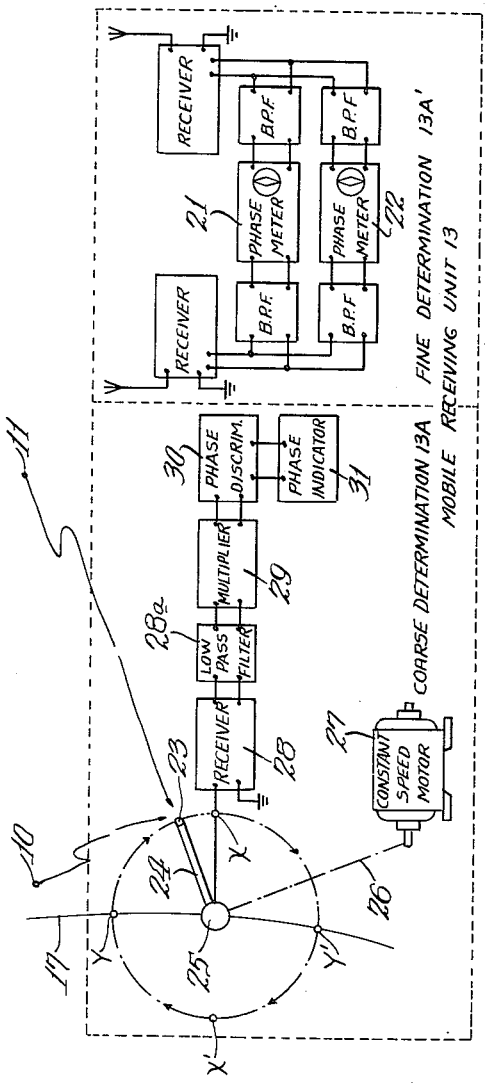
Figure 5:
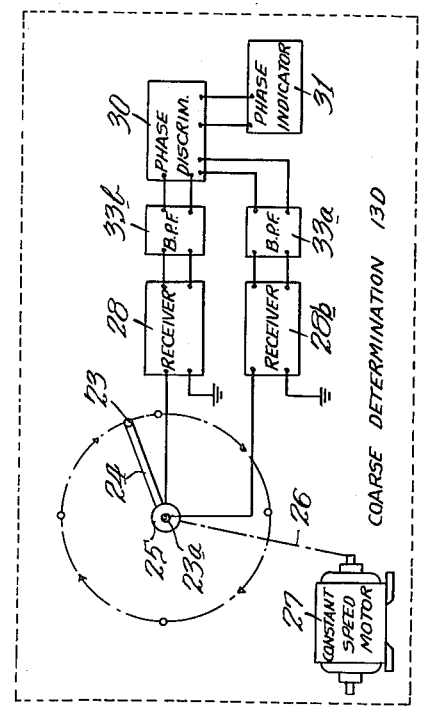

The invention both as to its organization and method of operation, together with further objects and advantages thereof will best be understood by reference to the specification, taken in conjunction with the accompanying drawings in which:

Fig. 1 is a pictorial representation of an area over which survey operations are to be performed illustrating one positional arrangement of the transmitters embodied in a three foci radio location system and also illustrating the hyperbolic grid-like pattern of isophase lines effectively produced in space by the signals radiated by the transmitters;

Fig. 2 diagrammatically illustrates receiving apparatus embodying the present invention for providing accurate position indications as well as an indication of the divergence of the hyperbolic isophase lines thereby facilitating an approximate position determination;

Fig. 3 diagrammatically illustrates an alternative construction of that portion of the receiving equipment shown in Fig. 2 which measures the divergence of the hyperbolic isophase lines;

Fig. 4 diagrammatically illustrates another arrangement of the receiving equipment for measuring the divergence of the hyperbolic lines at the receiving station; and Fig. 5 diagrammatically illustrates a still different arrangement of the receiving equipment for measuring the divergence of the hyperbolic isophase lines at the receiving station.

Referring now to Fig. 1 of the drawings, the invention is illustrated as embodied in a three foci hyperbolic continuous wave system which is preferably of the type disclosed and claimed in the above-identified Hawkins and Finn Patent No. 2,513,317, but which may be of any other type well known in the art for providing position information at a mobile receiving unit 13 carried by a vessel or vehicle 14 operating within the radius of transmission of a plurality of spaced transmitting units 10, 11 and 12. These transmitting units are preferably spaced apart approximately equal distances and are so positioned that the base line 15 joining the points of location of the units 10 and 11 is angularly related to the base line 16 joining the points of location of the units 11 and 12. The purpose of the transmitting units 10, 11, and 12 is to radiate position indicating signals in the form of carrier waves which effectively produce within the survey area an intersecting pattern of hyperbolic isophase lines, as indicated by the reference characters 17 and 18, the family of hyperbolas indicated by the numeral 17 being produced as a result of carrier wave radiation by the transmitting units 10 and 11 and the family of hyperbolic lines designated 18 resulting from carrier wave radiation by the units 11 and 12. Both of the families of hyperbolas 17 and 18 are characterized by isophase lines that are spaced relatively close together on the base lines 15 and 16 interconnecting the transmitting units and that diverge on either side of these base lines. The divergence of the hyperbolas constituting the grid-like pattern is a function of the distance from the base lines joining the units. In accordance with the present invention, measurement of the expansion of the hyperbolic lines at any point in the radiation pattern of the transmitting units 10, 11, and 12 provides a coarse position determination which identifies the particular lane between adjacent isophase lines within which the receiving unit 13 is located. An accurate fix of the position of the mobile unit within this lane may be attained by the use of conventional receiving and indicating equipment, such as that described and claimed in the above-identified Patent No. 2,513,317.

In the above identified application of Wilcox and Garrison there is disclosed a method of constructing an intersecting pair of constant expansion circles representative of the locus of all positions of the mobile receiving unit at which the hyperbolic lines 17 and 18 have the same rate of divergence. One such circle designated by the reference character 19 passes through the point of location of the receiving unit and through the points of location of the transmitting units 10 and 11 whereas the second of these constant expansion circles designated by the numeral 20 passes through the point of location of the receiving unit and through the points of location of the transmitting units 11 and 12. The intersection of these two constant expansion circles thus defines the point of location of the receiving unit.

As explained in the Wilcox and Garrison application the constant expansion circles may be constructed geometrically after a determination of the expansion factor of each of the families of hyperbolic lines 17 and 18 at the location of the mobile receiving unit 13. The expansion factor may be defined as the ratio of the lane width between adjacent hyperbolic lines at the mobile unit location to the lane width between adjacent hyperbolas along the base line. The expansion factor, which is in essence a measure of the divergence of the hyperbolic lines at any particular point, may be ascertained by measuring the difference in phase between signals received at receiving points spaced a fixed distance apart. The maximum phase difference between such signals will occur at points along the base line and the magnitude of the phase difference at other positions in the radiation pattern of the transmitting units varies inversely with the distance of the receiving point from the base line.

To facilitate an understanding of the present invention, first consider a receiving unit moving at constant speed within a hyperbolic field pattern in a direction perpendicular to one of the hyperbolic lines or along a path orthogonal to that particular hyperbola. This receiving unit may be of the type described in the identified Hawkins and Finn patent in which, during a first interval of operation, two signals from the transmitting units 10 and 11 are heterodyned and phase compared with a reference signal from the transmitting unit 12. If the antenna of the receiving unit is moved at a rate sufficient to traverse one lane of the hyperbolic system per second, a Doppler effect is produced and the phase meter indications increase or decrease by one cycle per second depending upon the direction of movement of the antenna. The Doppler frequency will be a maximum for any given speed of antenna movement when the mobile receiving unit is moving coincident with the base line and will be inversely proportional to the distance from the base line at any other point in the field pattern when moved normal to the hyperbola passing through the point. If the antenna were rotated in the hyperbolic field pattern, the frequency of the received signals would alternately increase or decrease at a rate proportional to the speed of rotation of the antenna.

Referring now to Fig. 1 the signals from transmitters 10 and 11 received at the mobile unit 13 will develop a heterodyne or beat frequency. In accordance with the present invention, this beat frequency is frequency modulated with a signal whose frequency is proportional to the speed of rotation of a rotating antenna. The magnitude of the phase deviation of this frequency modulated signal is directly proportional to the radius of rotation and is inversely proportional to the divergence of the hyperbolic lines in the region occupied by the antenna.

Referring now to Fig. 2, there is shown a coarse position determining unit 13A and a fine position determining unit 13A' comprising the mobile receiving equipment 13. The fine position unit 13A' may be of the type described in the aforementioned Hawkins and Finn patent but, since the function of this unit is merely to provide a pair of phase indications respectively indicative of the position of the location of the mobile unit between adjacent pairs of hyperbolas of the hyperbolic families 17 and 18, it is apparent that this equipment may be of any other suitable type. For purposes of illustration it will be assumed that phase meter 21 of the fine position determining unit 13A' indicates the fine position of the mobile receiving unit between adjacent isophase lines of the hyperbolic family 17 and that phase meter 22 indicates the position of the unit between adjacent isophase lines of the family 18. To provide a means for ascertaining the rate of divergence of the hyperbolic lines 17 at the location of the mobile receiving unit in order to furnish information for constructing the constant expansion circle 19, the coarse position determining unit 13A includes a vertical antenna 23 mounted on an offset arm 24 of fixed length. The offset arm is in turn fixedly mounted on a rotating pedestal 25 which is mechanically connected as represented by the dot and dash line 26 to a constant speed motor 27. Rotation of the motor 27 turns the offset arm 24 in a horizontal plane and causes rotation of the antenna 23 about a vertical axis passing through the center of the pedestal 25 in a circular path as indicated by the arrow pointed arcuate lines.

The coarse position determining unit 13A also includes a fixed tuned receiver 28 center tuned to a frequency midway between the frequencies of the position indicating signals radiated by the transmitting units 10 and 11, a low pass filter 28a, a fixed ratio frequency multiplier 29, a phase discriminator 30, and a phase deviation indicator 31. The receiver 28 is adapted to heterodyne the position indicating signals received at the antenna 23 from the transmitting units 10 and 11 and to reproduce a beat frequency signal equal to the difference between the frequencies of the two heterodyned carrier waves.

As the antenna 23 is rotated at constant speed by the motor 27, to occupy different positions in the field pattern established by the transmitting units 10 and 11, the beat frequency signal is alternately increased and decreased at a rate determined by the speed of rotation of the motor. Inasmuch as the offset arm 24 is relatively short, for instance, in the order of a few feet, the deviation of the beat frequency does not amount to a complete cycle but instead approximates a few degrees of phase deviation or variation, the actual magnitude of the phase deviation being a function of the offset arm length and the expansion of the hyperbolic lines. If the mobile receiving unit 13 is positioned so that one of the hyperbolic isophase lines 17 passes through the center of the pedestal 25, the antenna 23 is instantaneously located along this hyperbola twice for each complete revolution as designated by the points Y and Y' on the circular path of movement of the antenna. When the antenna is stationary in either of these two positions, the beat frequency developed by the receiver 28 is of exactly the same phase as would be produced by a stationary vertical antenna located at the center of the pedestal 25. Consequently, the signals developed when the antenna occupies either the Y or Y' position may be termed the zero phase deviation signals. When the antenna instantaneously occupies the positions designated X and X' on its circular path of movement, the phase deviation from the zero phase position will be a maximum and this phase deviation will either add to or subtract from the phase of the signals produced at the zero phase positions, the particular direction of this phase deviation being a function of the frequency relationship between the position indicating signals radiated by the transmitting units 10 and 11.

The effect of the cyclic increase and decrease in the phase of the beat frequency signal reproduced by receiver 28 is to frequency modulate this beat frequency at a frequency equal to the number of cycles of rotation of the antenna per second. Manifestly, the magnitude of the frequency deviation in the modulated signal is equal to the phase deviation at the antenna which is, in turn, dependent on the length of the arm 24 and on the expansion of the hyperbolic lines at the mobile unit 13. Since the length of the offset arm is a constant for any particular installation and since the magnitude of the phase deviation is inversely proportional to the expansion of the hyperbolic lines, measurement of the magnitude of this phase deviation enables a determination of the expansion factor of the hyperbolas.

The equipment for effecting a measurement of the phase deviation includes the phase discriminator 30 and the phase deviation indicator 31. As indicated above, the output of the receiver 28 is a frequency modulated signal varying at the rate of rotation of antenna 23 and having a phase deviation proportional to the expansion factor of the hyperbolas and the length of the arm 24. If a phase discriminator of sufficient sensitivity is available, the signal output of the receiver may be applied directly through the low pass filter 28a to the discriminator 30, which is adapted to produce a direct current signal output proportional in magnitude to the maximum deviation in phase of the applied signals from the zero phase position. The low pass filter 28a separates the frequency modulation component from the beat frequency signal and passes only the former signal together with its phase deviation to the discriminator 30. The phase indicator 31 is energized by the signal output of the discriminator and indicates directly the magnitude of the phase deviation, thereby providing a measured quantity from which the expansion factor of the hyperbolic lines at the mobile unit location may be determined.

For a typical installation, however, the transmitting units 10 and 11 may be operative to radiate position indicating signals at frequencies of 1772.000 and 1772.240 kilocycles, respectively, whereby the difference frequency therebetween is equal to 240 cycles. At these particular frequencies the hyperbolic isophase lines 17 effectively produced in space by radiations from these spaced transmitting units are spaced apart along the base line 15 a distance equal to one-half wave length of the mean frequency between the two carrier waves or a distance of approximately 278 feet. The radius of the offset arm 24 may be 1.54 feet thereby providing a maximum phase deviation along the base line 15 of $$\frac{1.54}{278} \times 360° \text{ or } \pm 2°$$

At a point in the hyperbolic pattern where the expansion rate of the hyperbolas is twice that occurring along the base line 15, the hyperbolic lines are spaced 556 feet apart and the phase deviation is reduced to ±1°. For one particular installation presently in use the expansion is doubled at a distance in the order of 35 miles from the base line 15 (Fig. 1) on the degenerate hyperbola bisecting that base line. Therefore, if the magnitude of the phase deviation can be obtained with an accuracy of one part in one thousand in this particular installation, the error in locating the expansion circle may be maintained less than 185 feet. An error of the magnitude indicated above provides a rough approximation of the location of the expansion circle 19 and facilitates a coarse position determination which cooperates with a second and similar coarse position determination to ascertain the particular pair of hyperbolic lines of the family of hyperbolas 17 between which the mobile receiving unit is located in a manner to be subsequently described in detail.

In order to maintain an accuracy of one part in one thousand, the phase deviation would have to be measured accurately to one thousandth of 1° along the expansion circle having an expansion factor equal to 2. Since it is difficult to provide a phase discriminator which will distinguish between phase deviations of this magnitude, it may not be convenient in certain installations to apply the output of the receiver 28 directly to the phase discriminator 30. In these installations, the frequency of the signal output of the receiver 28 is multiplied by a conventional frequency multiplier 29 in order to increase both the modulating frequency and the phase shift by a predetermined multiplication factor, for instance, a factor of 10,000. In this manner the magnitude of the phase shift is accentuated and a conventional phase discriminator may be employed which will be sufficiently sensitive to detect phase deviations at the requisite accuracy.

If the antenna 23 is rotated at a speed of 10 cycles per second and the phase deviation of one electrical degree $\pm(1°)$ is expressed in terms of cycles, the modulating frequency varies between 10.0028 and 9.9972 cycles per second. When the frequency output of the receiver is multiplied by 10,000 in the multiplier 29, this variation ranges from 100,028 to 99,972 cycles per second. The discriminator 31 is capable of distinguishing between the $\pm 28$ cycle deviation in the 100,000 cycle modulating frequency. The phase discriminator has a linear output characteristic curve so that the magnitude of its output signal is directly proportional to the magnitude of the phase deviation. The reading on the phase indicator 31 thus represents the phase deviation due to rotation of the antenna 24 and is indicative of the expansion of the isophase lines 17 at the position of the mobile unit. Having ascertained the expansion factor of the hyperbolic lines at the point of location of the mobile unit, the constant expansion curve 19 may be geometrically constructed as described in the above identified Wilcox and Garrison application.

The indication on the phase deviation indicator 31 provides only information for determining the location of the constant expansion circle 19 and therefore this indication is ambiguous in the sense that it is not indicative of the point on the expansion circle at which the mobile unit is located. To facilitate a determination of this point it is necessary to construct a second constant expansion circle 20 (Fig. 1) which intersects the circle 19 at a point representative of the approximate location of the receiving unit. In order to construct the second expansion circle passing through the location of the receiving unit and through the foci of the hyperbolic lines 18 at the transmitting units 11 and 12, it is necessary to obtain a measurement of the rate of divergence of the hyperbolic isophase lines 18 at the mobile receiving unit. Such a measurement may be effected by alternately switching the tuning of the radio frequency sections of the receiver 28 and applying the output to a second set of coarse position indicating facilities corresponding to the facilities shown in Fig. 2. This measurement may also be achieved by providing a second coarse position determining unit of the type designated 13A in which the receiver is center tuned to a frequency midway between the frequencies of the position indicating signals radiated by the transmitting units 11 and 12. A second rotating antenna may be provided for receiving the carrier wave radiations of the units 11 and 12, or alternatively, the antenna 23 may be employed to provide signals for the added receiver. The output of the additional receiver is preferably multiplied and applied to a second phase discriminator for driving a phase deviation indicator in order to measure the phase deviation in received signals radiated by the transmitting units 11 and 12. After measuring this phase deviation to provide a determination of the expansion factor of the hyperbolic lines 18 at the mobile receiving unit, the constant expansion circle 20 may be geometrically constructed as described in the Wilcox and Garrison application. The intersection of the two constructed expansion circles, of course, defines the approximate location of the mobile unit and facilitates the identification of the lanes within which the unit is positioned. The indications on the phase meters 21 and 22 of the fine position determining unit 13A' provide an exact determination of the position of the mobile receiving unit 13 within the approximate zone identified in the above indicated manner.

Another arrangement of the coarse position determining unit is shown in Fig. 3 which is basically the same as that shown in Fig. 2 except that it incorporates an alternating current generator 32 and a low pass filter 33 for the purposes which will subsequently become evident. The alternating current generator 32 is mechanically coupled, as indicated by the alternate dot and dash line 34, to the constant speed motor 27 driving the antenna 23 and thus the generator provides an output signal having a frequency corresponding to the rate of rotation of the antenna. As previously indicated, the signal output of the receiver 28 corresponds to the beat frequency signal between carrier waves appearing at antenna 23 frequency modulated at a rate equal to the rate of rotation of antenna 23 and having a maximum phase or frequency deviation dependent upon the divergence of the hyperbolic isophase lines at the location of the receiving unit 13. The frequency modulation signal may be separated from the beat frequency signal by the low pass filter 33 which has a cut-off frequency substantially below the beat frequency and somewhat above the highest modulation frequency to be passed. The signal output of the filter 33 may be applied directly to the phase discriminator 30 for phase comparison with the signal output of the alternating current generator 32. The phase discriminator compares the phase of the two applied signals and provides an output signal having a magnitude proportional to the maximum phase deviation between the applied signals. The magnitude of this output signal is measured by the phase indicator 31 which, therefore, provides an indication of the maximum variation in the phase of signals appearing at the antenna 23 due to carrier wave radiation from the units 10 and 11. Since the arm 24 is of fixed length this maximum phase variation is a function solely of the divergence of the hyperbolic isophase lines 17 at the receiving unit. From the indication provided by the meter 31, the constant expansion circle 19 may be constructed passing through the points of location of the transmitting units 10 and 11.

In the event that the magnitude of the phase deviation in signals reproduced by receiver 28 is insufficient to produce a signal of measurable magnitude at the output of the discriminator 30, the output signals of the low pass filter 33 and of the alternating current generator 32 may both be multiplied by suitable multiplying circuits in the manner previously described. One such multiplier may be connected between the output terminals of the filter 33 and one set of input terminals of the phase discriminator and a second multiplier may be connected between the output terminals of the generator 32 and another set of input terminals of the discriminator. As previously indicated, the function of these multipliers is to increase the frequency variation between applied signals to an extent enabling detection by the discriminator in order to provide an output signal accurately representative of the variation.

From the foregoing explanation, it will be apparent that the coarse position determining unit 13B actually represents only one half of the coarse position determining equipment required to provide an approximate position determination. To provide an indication from which a second constant expansion circle may be constructed intersecting the expansion circle derived from the indication on meter 31, a second coarse position determining unit like the unit 13B is necessary. Obviously, however, the constant speed motor 27 and the alternating current generator 32 may be common to both of these units and it may be possible to employ a single rotating antenna for supplying signals to the receivers of both units. As previously indicated, the second coarse position indication may also be attained by alternately switching the tuning of the radio frequency section of receiver 28 to a frequency midway between the frequencies of the second pair of position indicating signals radiated by the transmitting units 10 and 12. The second phase indication then provides measurement of the divergence of the hyperbolic lines 18 at the receiving unit from which the constant expansion circle 20 may be constructed.

One of the principal problems encountered in the operation of the system shown in Figs. 1, 2 and 3 is the requirement that the speed of rotation of the antenna 23 remain constant. Thus, while the magnitude of the phase deviation between signals appearing at the antenna 23 is a function solely of the divergence of the hyperbolic isophase lines at the location of the receiving unit if the rotating arm 24 is of fixed length, the rate of the phase deviation appearing in the output of receiver 28 is, in addition, a function of the speed of rotation of the antenna. If the phase discriminator 30 is to distinguish between a zero phase signal having a frequency equal to the frequency of rotation of the antenna, and a change in the phase of received signals either with or without multiplication by the multiplier 29, it is apparent that constant speed of antenna rotation is essential. A coarse position determining unit designated by the reference character 13C is shown in Fig. 4 which is essentially the same as the unit 13B shown in Fig. 3 but which also includes means for assuring a constant speed of antenna rotation. It is apparent that the coarse position determining unit 13C is identical to the unit 13B except for the addition of a tuning fork 35, a discriminator 36 and a direct current amplifier 37, the function of these three added elements being to maintain constant the rate of rotation of the antenna 23. Those elements of the unit 13C which correspond with identical elements of the unit 13B function to provide an indication on the phase indicator 31 representative of the divergence of the hyperbolas at the receiving unit 13. The operation of these elements has previously been described in conjunction with the coarse position determining unit shown in Fig. 3, and will, therefore, be understood without further description. It is noted, however, that the A. C. generator 32 is driven by the constant speed motor 27 at a rate corresponding to the rate of rotation of the antenna 23. The tuning fork 35 is designed to generate a signal having a highly stable frequency equal to the desired rate of rotation of the antenna, and, therefore, equal to the desired signal output of the A. C. generator 32. The output signal of the generator and that of the tuning fork 35 are both applied to the phase discriminator 36 which produces a direct current output signal having a polarity dependent upon the direction of any frequency deviation therebetween and proportional in magnitude to the amount of deviation in frequency or phase between the two applied signals. The signal output of the discriminator 36 is amplified by the direct current amplifier 37 in order to provide a signal of sufficient strength to control the speed of rotation of the motor 27. As long as the motor 27 rotates at the desired speed, the frequency of the signal produced by generator 32 is identical to that produced by tuning fork 35 and, consequently, there is no output signal from the discriminator 36. If, however, the speed of the motor 27 departs from the desired rate the discriminator 36 produces a direct current signal of proper polarity to cause the motor 27 to return to the desired speed of rotation. Thus the speed of rotation of the motor 27 is maintained at a rate which is approximately as stable as the output frequency of the tuning fork 35 thereby providing a solution to the problem of maintaining a constant speed of rotation of the antenna 23.

There is illustrated in Fig. 5 a further embodiment of the invention including a coarse position determining unit 13D for measuring the divergence of hyperbolic isophase lines in the area occupied by a rotating antenna 23. In addition to the rotating antenna which is identical to that previously described, the unit 13D also includes a stationary antenna 23a positioned at approximately the center of the pedestal 25. The rotating antenna is connected to a receiver 28 which, as before, develops an output consisting of the beat frequency between the two carrier waves appearing at the antenna 23 frequency modulated at a rate corresponding to the rate of antenna rotation and having a maximum phase deviation or variation of a magnitude which is directly proportional to the length of the arm 24 and inversely proportional to the divergence of the hyperbolic lines. The band pass filter 33b passes the frequency modulated heterodyne signal applied thereto from the receiver 28 and applies the same to the phase discriminator 30.

The two carrier wave signals received by the antenna 23a are applied to receiver 28b where they are heterodyned to provide a beat frequency signal identical in frequency to the heterodyne signal output of receiver 28b. It will be apparent that the beat frequency signal reproduced by receiver 28b corresponds to the zero phase position signal referred to in the description of the unit shown in Fig. 2. The beat frequency signal output of receiver 28b is passed by band pass filter 33a and is applied to the discriminator 30 where it is compared with the signal passed by filter 33b. The discriminator functions to produce a signal having a frequency which is proportional to the rate of rotation of the antenna and an amplitude proportional to the magnitude of the maximum phase deviation. Since the rate of antenna rotation is a constant it is apparent that the indication on the phase indicator 31 is a measure of the divergence of the hyperbolic lines in the vicinity of the antenna 23. From this latter measurement one of the two required constant expansion circles may be constructed passing through two of the three transmitting units and through the location of the receiving equipment. A second phase deviation measurement may be derived with respect to a different pair of transmitting units in order to facilitate the construction of the second constant expansion circle thus providing a coarse position determination. As previously indicated, this second measurement may be effected either by duplicating all of the equipment at the unit 13D except the antennas 23 and 23a or by alternately switching the tuning of the radio frequency sections of the receivers 28 and 28b.

From the foregoing explanation it will be apparent that the present invention provides improved apparatus for providing an indication of the rate of divergence of hyperbolic isophase lines at a mobile receiving station thereby facilitating a coarse determination of the location of the station within a hyperbolic field pattern. It is also apparent that the described system affords a satisfactory solution to the problem of ambiguity resolution without necessitating the use of an additional channel frequency. Furthermore, it will be appreciated that all of the apparatus for providing both coarse and fine position determinations is positioned at a central location aboard the vessel or vehicle carrying the mobile receiving equipment thereby eliminating the use of relatively long signal carrying conductors and the like. Another obvious advantage of the present invention resides in the fact that only a single antenna is employed thereby permitting the use of the coarse position determining system aboard even very small mobile vessels or vehicles.

While particular embodiments of the invention have been shown, it will be understood, of course, that the invention is not limited thereto since many modifications may be made, and it is contemplated by the appended claims to cover any such modifications as fall within the true spirit and scope of the invention.

What is claimed as new and desired to be secured by Letters Patent of the United States is:

1. In a system of the hyperbolic continuous wave type for determining the position of a mobile unit with respect to a hyperbolic field pattern, apparatus for ascertaining the rate of divergence of the hyperbolic lines at a receiving station which comprises a rotatable antenna for receiving the radiated signals forming said pattern, means for rotating said antenna to produce phase variations in the antenna output signals, the magnitude of said phase variations being dependent upon the divergence of said hyperbolic lines at the mobile unit, and means for indicating the magnitude of said phase variations.

2. In a system of the hyperbolic continuous wave type for determining the position of a mobile unit with respect to a hyperbolic field pattern, apparatus for ascertaining the rate of divergence of the hyperbolic lines at a receiving station which comprises a movable antenna, means for moving said antenna with respect to said hyperbolic lines at a cyclical rate thereby varying the phase of the antenna output signals at the same cyclical rate, the magnitude of said phase variations being a function of the divergence of the hyperbolic lines at the mobile unit, and means for indicating the magnitude of said phase variations.

3. Receiving apparatus for use in hyperbolic continuous wave systems to determine the position of a mobile unit with respect to a hyperbolic field pattern established by a plurality of spaced transmitters, comprising means for heterodyning the signals radiated by at least two of said transmitters, means at said receiving apparatus for varying the phase of the heterodyned signals at a predetermined rate, the magnitude of said phase variations being a function of the divergence of the hyperbolic lines at the mobile unit, and means for indicating the magnitude of said phase variations.

4. Receiving apparatus for use in hyperbolic continuous wave systems to determine the position of a mobile unit with respect to a hyperbolic field pattern established by a plurality of spaced transmitters, comprising means for heterodyning the signals radiated by a pair of said transmitters to produce a beat frequency signal, means for frequency modulating said beat frequency signal at a predetermined rate by inducing a phase deviation in said beat frequency, and means for providing an indication of the magnitude of the phase deviation.

5. Receiving apparatus for use in hyperbolic continuous wave systems to determine an unknown position with respect to a hyperbolic field pattern established by a plurality of spaced transmitters comprising means for receiving signals indicative of the phase position of said receiving apparatus with respect to one pair of said transmitters, means for varying the phase of the received signals at a predetermined rate, the magnitude of said phase variations being a function of the expansion of the hyperbolic lines at the location of the receiving apparatus, and means for indicating the magnitude of the phase variations.

6. In a system of the hyperbolic continuous wave type for determining the position of a mobile unit with respect to a hyperbolic field pattern, apparatus for ascertaining the rate of divergence of the hyperbolic lines at a receiving station comprising a receiving means for receiving signals indicative of the phase position of said mobile unit, means for varying the phase of the received signals by an amount which is a function of the divergence of the hyperbolic lines at the mobile unit, and means for indicating the variations in phase of said received signals.

7. In a system of the hyperbolic continuous wave type for determining an unknown position within a hyperbolic field pattern, apparatus for ascertaining the rate of divergence of the hyperbolic lines at a receiving station which comprises a receiving antenna for receiving signals indicative of the phase position of said receiving station, means for varying the phase of the received signals by an amount which is a function of the divergence of the hyperbolic lines at the location of the receiving station, and means for indicating the relative magnitude of the phase variations.

8. In a system of the hyperbolic continuous wave type for determining an unknown position within a hyperbolic field pattern, apparatus for ascertaining the rate of divergence of the hyperbolic lines at a receiving station comprising a receiving means for receiving signals indicative of the phase position of said receiving station, means for cyclically varying the phase of the received signals by an amount which is a function of the rate of divergence of the hyperbolic lines at the receiving station, phase sensitive means for providing signals representative of the magnitude of the phase variations, and indicating means responsive to the signals provided by said phase sensitive means for indicating the magnitude of the phase variations.

9. In a system of the hyperbolic continuous wave type for determining an unknown position within a hyperbolic field pattern, apparatus for ascertaining the rate of divergence of the hyperbolic lines at a receiving station comprising a receiving means for receiving signals indicative of the phase position of said mobile unit, means for cyclically varying the phase of the received signals by an amount which is a function of the divergence of the hyperbolic lines at the receiving station, means for multiplying the frequency of the cyclically varying phase variations, phase sensitive means responsive to the multiplied cyclical variations for providing a signal representative of the magnitude of said variations, and indicating means responsive to the signal provided by said phase sensitive means for indicating the magnitude of the phase variations.

10. In a system of the hyperbolic continuous wave type for determining an unknown position within a hyperbolic field pattern, apparatus for ascertaining the rate of divergence of hyperbolic lines at a receiving station which comprises a rotatable offset antenna for receiving the radiated signals forming said pattern, means for rotating said antenna at constant speed to produce phase variations in the antenna output signals, the maximum phase variation being dependent upon the divergence of the hyperbolic lines at the receiving station, and means for indicating the magnitude of said phase variations.

11. In a system of the hyperbolic continuous wave type for determining the position of a receiving station with respect to a hyperbolic field pattern, apparatus for ascertaining the rate of divergence of the hyperbolic lines at the receiving station which comprises a movable antenna, means for moving said antenna with respect to said hyperbolic lines at a cyclical rate thereby varying the phase of the antenna output signals at the same cyclical rate, the magnitude of the phase variations being a function of the divergence of the hyperbolic lines at the receiving station, phase sensitive means for developing a signal indicative of the magnitude of said phase variations, and indicating means responsive to the signals developed by said phase sensitive means for indicating the magnitude of the phase variations.

12. In a system of the hyperbolic continuous wave type for determining the position of a mobile unit with respect to a hyperbolic field pattern, apparatus for ascertaining the rate of divergence of the hyperbolic lines at a receiving station which comprises an antenna rotatable to different positions with respect to said hyperbolic field pattern, the phase of the signal output of said antenna in each position being a function of its location in the hyperbolic pattern, means for rotating said antenna, receiving means for reproducing the signal output of said antenna and for providing a signal indicative of the variation in phase between signals produced at the different positions, and means responsive to the signals provided by said receiving means for indicating the magnitude of the maximum phase variation thereby providing a measure of the divergence of the hyperbolic lines in the region of said antenna.

13. In a system of the hyperbolic continuous wave type for determining the position of a mobile unit with respect to a hyperbolic field pattern, apparatus for ascertaining the rate of divergence of the hyperbolic lines at a receiving station which comprises an antenna movable to different positions with respect to said hyperbolic field pattern, means for moving said antenna at a cyclic rate, means for receiving the signals developed by said antenna and for reproducing a signal indicative of the maximum variation in phase between signals developed at the different positions, and means for indicating the relative magnitude of said maximum phase variation.

14. In a system of the hyperbolic continuous wave type for determining the position of a mobile unit with respect to a hyperbolic field pattern, apparatus for ascertaining the rate of divergence of the hyperbolic lines at a receiving station which comprises an antenna movable to different positions with respect to said hyperbolic field pattern, means for moving said antenna at a cyclic rate, a receiving means, means for applying the signals developed at said antenna at the different positions to said receiving means thereby producing signals of varying phase in which the phase variation is a function of the position of said antenna in the hyperbolic field, means associated with the antenna moving means for developing a signal having a frequency related to said cyclic rate, phase sensitive means responsive to said last named signal and the signals produced by said receiving means for developing a signal representative of the magnitude of the maximum phase variation of the signals developed at said antenna, and indicating means responsive to the signal developed by said phase sensitive means for indicating the magnitude of the maximum phase variation.

15. In a system of the hyperbolic continuous wave type for determining the position of a mobile unit with respect to a hyperbolic field pattern, apparatus for ascertaining the rate of divergence of the hyperbolic lines at a receiving station which comprises an antenna rotatable to different positions with respect to said hyperbolic field pattern, means for rotating the antenna at a predetermined rate, receiving means responsive to signals appearing at said antenna for producing signals varying in phase in accordance with the position of the antenna with respect to said hyperbolic field pattern, means associated with the antenna rotating means for producing a signal having a frequency related to said predetermined rate, and indicating means responsive to said last named signal and to the varying phase signals reproduced by the receiving means for providing an indication of the magnitude of the maximum phase variation thereby indicating the divergence of the hyperbolas in the region of the receiving station.

16. In a system of the hyperbolic continuous wave type for determining the position of a mobile unit with respect to a hyperbolic field pattern, apparatus for ascertaining the rate of divergence of the hyperbolic lines at a receiving station which comprises an antenna movable to different positions with respect to said hyperbolic field pattern, means for moving said antenna at a cyclic rate, a receiving means responsive to signals appearing at said antenna for producing signals varying in phase in accordance with the position of the antenna with respect to said hyperbolic field pattern, signal generating means for developing a signal having a frequency related to said cyclic rate, phase comparison means for comparing the phase of the last-named signal with the phase of the signals produced by said receiving means to provide a signal representative of the maximum phase variation, and indicating means responsive to the last-named signal for indicating the magnitude of the phase variations thereby indicating the divergence of the hyperbolas in the vicinity of the receiving station.

17. In a system of the hyperbolic continuous wave type for determining the position of a mobile unit with respect to a hyperbolic field pattern, apparatus for ascertaining the rate of divergence of the hyperbolic lines at a receiving station comprising a receiving means for receiving signals indicative of the phase position of said mobile unit, means for varying the phase of the received signals at a predetermined rate, means for generating a signal representative of the signals of unvaried phase at said receiving means, phase comparison means for comparing the phase of the generated signal with the varying phase signals to produce a signal representative of the phase variation produced by said phase varying means, and means responsive to said last-named signal for indicating the magnitude of the phase variation.

18. In a system of the hyperbolic continuous wave type for determining the position of a mobile unit with respect to a hyperbolic field pattern, apparatus for ascertaining the rate of divergence of the hyperbolic lines at a receiving station which comprises an antenna rotatable to different positions within said hyperbolic field pattern, means for rotating the antenna at a predetermined rate, receiving means responsive to signals appearing at said antenna for producing a signal varying in phase in accordance with the position of the antenna with respect to said hyperbolic field pattern, control means for maintaining the speed of the antenna rotating means constant, said control means including signal generating means for developing a signal having a frequency accurately related to the desired rate of rotation of the antenna rotating means, a second signal generating means driven by said driving means for producing a signal representative of the actual rate of rotation of the antenna rotating means, means for comparing the signals produced by said first and second signal generating means and for producing an error signal representative of any difference in frequency, means responsive to said error signal for altering the rate of rotation of said antenna rotating means, phase comparison means for comparing the phase of the signals from said second signal generating means and the varying phase signals produced by said receiving means and for producing a signal indicative of the phase variation, and indicating means responsive to the last-named signal for providing an indication of the phase variation.

19. In a system of the hyperbolic continuous wave type for determining the position of a mobile unit with respect to a hyperbolic field pattern, apparatus for ascertaining the rate of divergence of the hyperbolic lines at a receiving station comprising a receiving means for receiving signals indicative of the phase position of said mobile unit, means for varying the phase of the received signals at a predetermined rate by an amount which is a function of the divergence of the hyperbolic lines at the mobile unit, signal generating means for providing a signal related in frequency to said predetermined rate, means for comparing the last named signal with the varying phase signals and for producing a signal representative of the magnitude of the phase variations, and means responsive to the last mentioned signal for indicating the phase variation.

20. In a system of the hyperbolic continuous wave type for determining the position of a mobile unit with respect to a hyperbolic field pattern, apparatus for ascertaining the rate of divergence of the hyperbolic lines at a receiving station comprising a receiving means for receiving signals indicative of the phase position of said mobile unit, means for varying the phase of the received signals at a predetermined rate by an amount which is a function of the divergence of the hyperbolic lines at the mobile unit, a first signal generating means for producing a signal related in frequency to said predetermined rate, a second signal generating means for producing a signal representative of the actual rate of said phase variations, means for comparing the frequencies of the signals from said first and second signal generating means to provide an error signal, speed control means responsive to said error signal for maintaining the variations produced by said phase varying means at said predetermined rate, means for comparing the phase of the phase varying signals with the phase of the signal developed by said second signal generating means to provide a signal representative of the magnitude of the phase variations, and means responsive to the last named signal for indicating the magnitude of said phase variations.

References Cited in the file of this patent

UNITED STATES PATENTS

| | | |
|---|---|---|
| 2,405,281 | Bemis | Aug. 6, 1946 |
| 2,414,798 | Budenbom | Jan. 28, 1947 |
| 2,481,509 | Hansel | Sept. 13, 1949 |
| 2,608,685 | Hastings | Aug. 26, 1952 |